(12) United States Patent
Howard

(10) Patent No.: US 7,136,506 B2
(45) Date of Patent: Nov. 14, 2006

(54) CORRELATION BASED IN FRAME VIDEO TRACKER

(75) Inventor: Robert J. Howard, Clifton, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 826 days.

(21) Appl. No.: 10/376,283

(22) Filed: Mar. 3, 2003

(65) Prior Publication Data

US 2004/0175019 A1 Sep. 9, 2004

(51) Int. Cl.
G06K 9/00 (2006.01)

(52) U.S. Cl. ...................................... 382/103

(58) Field of Classification Search ............... None
See application file for complete search history.

(56) References Cited

U.S. PATENT DOCUMENTS

| | | |
|---|---|---|
| 4,133,004 A | 1/1979 | Fitts |
| 4,719,584 A | 1/1988 | Rue et al. |
| 4,849,906 A | 7/1989 | Chodos et al. |
| 4,958,224 A | 9/1990 | Lepore et al. |
| 4,982,339 A | 1/1991 | Insana et al. |
| 5,062,056 A | 10/1991 | Lo et al. |
| 5,086,480 A | 2/1992 | Sexton |
| 5,838,365 A | 11/1998 | Sawasaki et al. |
| 5,872,857 A | 2/1999 | Chodos et al. |
| 5,940,145 A | 8/1999 | Burl |
| 5,982,420 A | 11/1999 | Ratz |
| 6,264,609 B1 | 7/2001 | Herrington et al. |
| 6,275,724 B1 | 8/2001 | Dickinson et al. |
| 6,368,277 B1 | 4/2002 | Mao et al. |
| 6,398,736 B1 | 6/2002 | Seward |
| 6,463,167 B1 | 10/2002 | Feldman |
| 6,544,187 B1 | 4/2003 | Seward |
| 6,553,327 B1 | 4/2003 | Degani |
| 6,694,064 B1* | 2/2004 | Benkelman ............ 382/284 |
| 6,720,920 B1* | 4/2004 | Breed et al. ............ 342/386 |
| 2002/0198632 A1* | 12/2002 | Breed et al. ............ 701/1 |
| 2003/0021463 A1* | 1/2003 | Yamaguchi et al. ...... 382/145 |
| 2003/0081824 A1* | 5/2003 | Mennie et al. ........... 382/135 |

* cited by examiner

Primary Examiner—Samir Ahmed
Assistant Examiner—O'Neal R. Mistry
(74) Attorney, Agent, or Firm—Mark A. Wurm

(57) ABSTRACT

A video correlation tracking system captures a first image frame and identifies one or more reference patches in that image frame. In a successive image frame, the new location of a reference patch is estimated with a dead reckoning algorithm, and a trial patch is placed at that location. The system cross correlates each reference patch with its corresponding trial patch, the results of which are used to make corrections to the dead reckoning algorithm, register successive image frames, and determine at which reference patch processing resources should be concentrated.

20 Claims, 2 Drawing Sheets

CORRELATION BASED IN FRAME VIDEO TRACKER

FIELD OF THE INVENTION

The present invention relates to video correlation trackers, and in particular, video correlation trackers that efficiently track, identify and register objects of interest.

BACKGROUND

There are numerous applications in the video processing arts where it is necessary to either track objects of interest from one image frame to the next, or to record an image and compare the saved image with another saved image or a current image. In general, such applications include unmanned air vehicle (UAV) navigation, mapping, object identification, and scene reconstruction.

For example, when identifying an object on the ground from a camera on a UAV, the system tracks the object from image frame to image frame until a level of certainty is reached that the object is identified. Objects are identified by passing the information from each successive image frame to a classification algorithm. In identifying the object of interest from image frame to image frame, each image frame or a portion thereof must be processed and reprocessed until the associated classification algorithm's output level has exceeded a predetermined threshold at which point an identification is declared. Such processing and reprocessing requires a tremendous amount of computer resources.

Consequently, video correlation tracking would benefit from an improved system that tracks objects and registers images with a minimal expenditure of processing time and other

SUMMARY OF THE INVENTION

The present invention uses a video correlation system to track objects from image frame to image frame. The invention identifies and stores reference patches from a first image frame. A reference patch is an area of the image delineated by a boundary, and is either placed along the leading edge of the image in search of a contrast anomaly, or it is placed around an object of interest (that has been identified via a classification algorithm). The invention then estimates, through the use of a dead reckoning algorithm, where the reference patch should appear in a successive image frame, and places a trial patch at that location in the image frame.

Thereafter, the invention cross-correlates the positions of the trial patches and reference patches. The cross-correlation produces two benefits. First, the displacement of a correlation peak generated by the cross correlation is used to estimate corrections to the dead reckoning algorithm. These corrections are fed into the dead reckoning algorithm and used to correct future predictions. Second, the cross-correlation produces tie points that are used to register the image. The tie points are also used to identify where objects of interest are located, and in turn where processing resources should or should not be concentrated.

It is consequently an object of the present invention to estimate corrections to a dead reckoning algorithm.

It is another object of the present invention to identify reference patches whose associated object of interest has been identified by a classification algorithm, and release said reference patch to free up processing resources.

DETAILED DESCRIPTION

Figure 1:
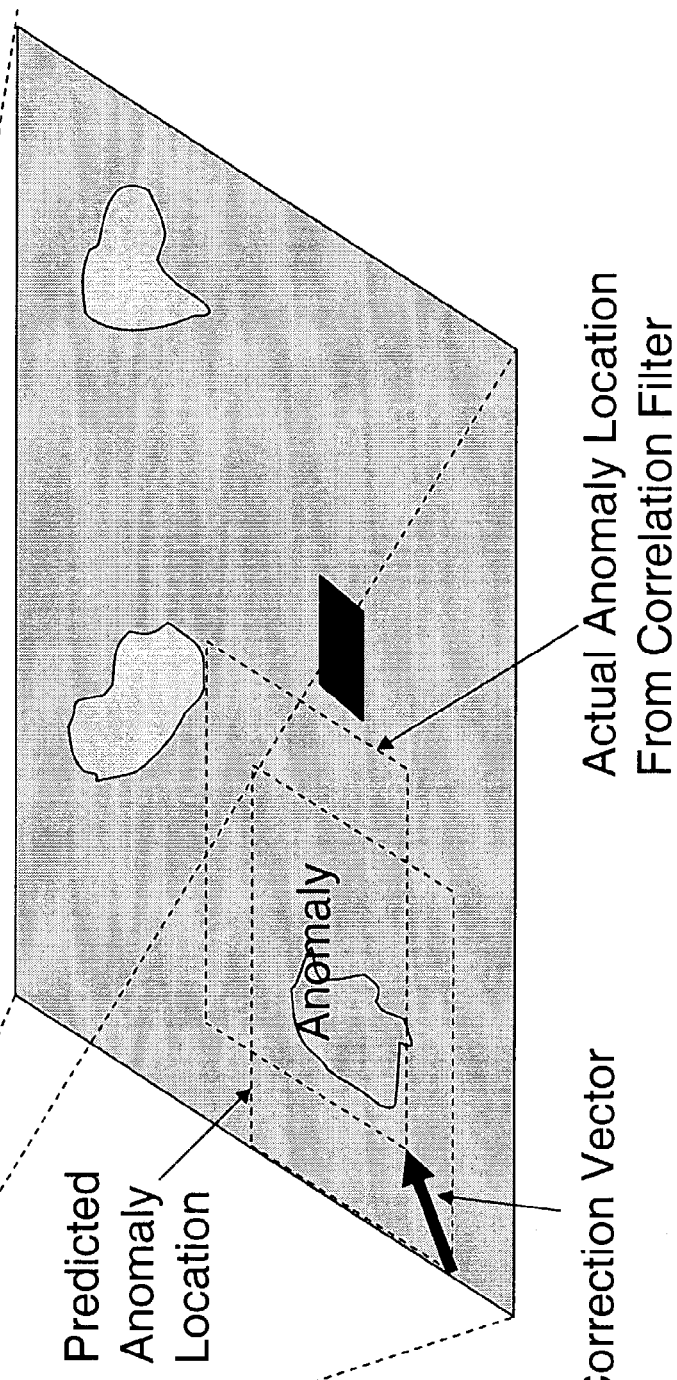
FIG. 1 illustrates a camera mounted on an air vehicle and its corresponding field of view.
Figure 1:
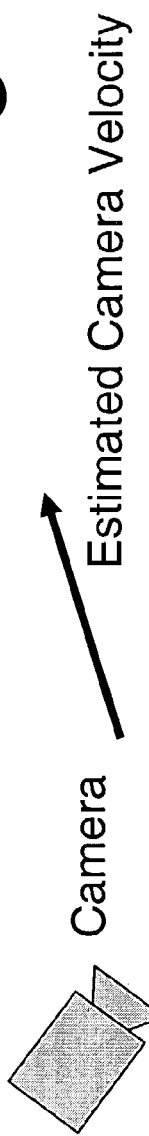

FIG. 1 illustrates an environment in which the present invention functions. A camera 20, or other video sensing or recording device, is positioned such that its field of vision encompasses an area of interest. Such a set up includes a camera mounted on a manned or unmanned air vehicle, a security camera mounted on a building, or a camera positioned in a manufacturing facility to track one or more manufacturing lines. In these environments, the present invention may perform one or more functions—the identification and tracking of images through the use of contrast anomalies and classification algorithms, the prediction of future positions of objects of interest, the identification of areas of interest in the image frame where processing power is to be concentrated, and/or the identification of areas of little or no interest on which processing resources should not be expended.

Figure 2:
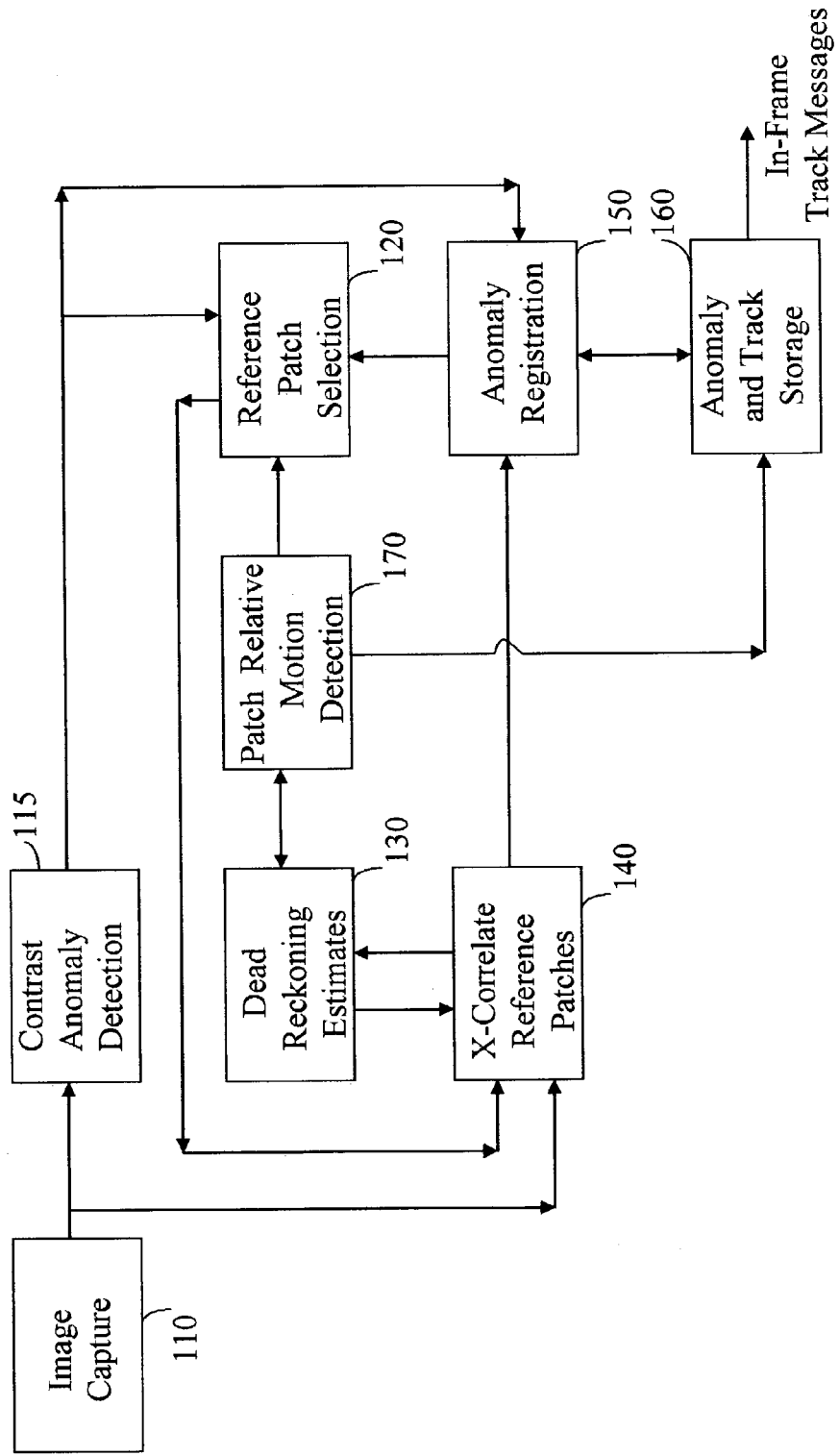
FIG. 2 illustrates the steps of the present invention.

When implemented on a UAV with a camera that scans the terrain below, for example to identify objects of interest, the present invention functions as illustrated in FIG. 2. The system first captures an image frame (110). At least one, and preferably three or more, reference patches are selected for that image frame (120). Reference patches are two-dimensional pixel arrays, or a memory segment containing data about the two-dimensional reference patch, that outline a portion of the entire image. The boundaries of a reference patch are large enough to account for uncertainties in camera motion.

The system selects reference patches in one of two ways. First, it can select a portion of the image frame along the leading portion of the image frame. Such a selection along the leading edge of the image depends upon the presence of contrast anomalies along that leading edge of the image (e.g. the contrast between the water in a lake and the shoreline) (115). Contrast anomalies are identifiable because in a natural scene, it is unusual to see high contrasts. When high contrasts appear, it is normally the result of an object of interest, e.g., a body of water. Alternatively, the reference patch may be selected to have strong texture as this will tend to produce a narrower, more pronounced correlation peak. In addition to contrast anomalies, the system can place a patch around an object of interest that has been identified by a classification algorithm.

After selection of reference patches, the data regarding these patches are stored in some manner, preferably in a processor-based medium. At this point, the system captures and begins processing a successive image. Specifically, the system estimates where each reference patch from the previous frame should appear in the new image frame. The system then places a trial patch at this estimated location. The trial patch marks the location corresponding to its associated reference patch (according to variables such as the speed of the camera) in this new image frame. The position of a trial patch is estimated and placed in the image frame for each reference patch.

The placement of a trial patch in the new image is accomplished through the use of well-known dead reckoning techniques (130). In general, dead reckoning takes into account the speed, acceleration, rotation and course of travel of an object of interest, and uses that information to predict where the object of interest, and hence the trial patch, should be located. There are several tools that can be used to implement dead reckoning, such as Kalman filters, alpha/beta trackers, or even simple integration techniques. All of these tools depend on state vectors that have multiple inputs for parameters describing the dynamics of the system. While each of these systems involve complex computations and state vector analysis, they all use the fact that the speed of a stationary object of interest is the speed of the UAV on which a camera is mounted. This fact, coupled with the known elapsed time between image frames, and the known width of the area covered by the image frame, is used to locate the position of the trial patch.

The system cross-correlates (using two dimensional fast Fourier transforms) each trial patch with its respective reference patch in the current frame (140). The cross correlation identifies the difference in the position of a trial patch and its associated reference patch. If the position of the trial patch correlates exactly with the position of the reference patch, no change need be made to the dead reckoning algorithm. If the coordinates of the trial patch do not correlate with the coordinates of the reference patch, then depending on whether the mismatch is a result of speed, direction, or a combination of the two, corrections are made to the dead reckoning algorithm's coefficients.

The cross-correlation also produces tie points, which are a new estimate of the center of the reference patch (of the next image frame). The tie points also provide coefficients for an interpolation (e.g. a bilinear interpolation) so that points from a previous image can be mapped onto points for a successive image. It is in this manner that the images are registered in a common coordinate system (150, 160).

As the UAV and camera travel over the area of interest capturing successive images, the dead reckoning algorithm's coefficients will tend to converge and become more accurate due to the normal accumulation of statistics. In addition, since each new image adds information for the classification algorithm to process, the confidence level of the classification algorithm will also increase with each successive frame. One way of determining the threshold level required to achieve a given confidence level for classification is met is through the use of a receiving operating curve (ROC). When the threshold is met, and the object is identified and registered, the patch dedicated to that object of interest can be released to be used in connection with new objects of interest coming into the field of vision at the leading edge of the image frame. Patches are also released when they move off the trailing edge of the image. After the system releases the patch of a particular object of interest, processing resources are no longer expended on that object of interest, and can be dedicated to processing new objects of interest, or concentrating on an area of interest.

While certain objects of interest are readily identifiable by the system and will require few image frames before a level of confidence is obtained, other objects may be more difficult to identify. Such objects are prime candidates for the concentration of processing resources. For example, if the system is trying to identify telephone poles in an area of interest, and the UAV is slightly offset above a pole, the contrast produced by the pole indicates a short longitudinal object, then indicates a circular object as the UAV moves over the pole, then once again indicates a short longitudinal object as the UAV begins to move away from the pole, and then finally indicates the appearance of a telephone pole as the UAV moves away from the pole and the camera and classification algorithm see the outline of the telephone pole. During this time period, numerous image frames are captured and processed. The present invention is able to relinquish processing resources from objects that have been identified to a certain level of confidence, and use those resources to identify comparatively difficult to identify objects such as telephone poles.

If the reference patch identifies an object of interest that is in motion, that reference patch is rejected and recycled since a moving object introduces error into the system (170). One way that the system determines that an object is moving is that the object moves in the image frame in a different direction than all the other objects of interest. The increased error caused by moving objects is due to the fact that the estimation of trial patch location is based on a dead reckoning algorithm, which takes into account the known speed of the camera, not the unknown speed of the object of interest.

While the invention has been described in its preferred embodiment, the words used are words of description rather than limitation, and changes may be made within the purview of the appended claims without departing from the true scope and spirit of the invention in its broader aspects.

The invention claimed is:

1. A method to track objects in a video processing system from image frame to image frame, comprising the steps of:
capturing a first image;
identifying an object of interest in said first image with a reference patch;
capturing a second image;
estimating a position of said object of interest in said second image through the use of a dead reckoning algorithm, and marking said position with a trial patch;
cross correlating said trial patch and said reference patch;
using said cross correlation to make corrections to said dead reckoning algorithm;
further using said cross correlation to calculate tie points;
using said tie points to establish a common coordinate system between said first and said second image; and
identifying reference patches that have been determined by a classification algorithm, and releasing said reference patches to free up processing resources.

2. The method to track objects in a video processing system according to claim 1, wherein said reference patch is identified through a contrast anomaly.

3. The method to track objects in a video processing system according to claim 1, wherein said corrections to said dead reckoning algorithm are based on the displacement of a correlation peak of said cross correlation, and further wherein said corrections are fed into said dead reckoning algorithm to correct future predictions of trial patch locations.

4. The method to track objects in a video processing system according to claim 1, wherein said tie points are used to register said images.

5. The method to track objects in a video processing system according to claim 1, wherein said reference patch is identified so as to have strong texture.

6. The method to track objects in a video processing system according to claim 1, further comprising the step of identifying a second object of interest with a released reference patch.

7. The method to track objects in a video processing system according to claim 1, wherein said dead reckoning algorithm is corrected by adjusting coefficients within said dead reckoning algorithm.

8. The method to track objects in a video processing system according to claim 1, wherein said tie points are used as coefficients in a bilinear interpolation, said bilinear interpolation resulting in the registration of images in a common coordinate system.

9. The method to track objects in a video recording system according to claim 1, wherein said reference patch identifies an object of interest that is in motion, and further wherein said reference patch that is associated with said object of interest in motion is rejected.

10. An apparatus to track objects in a video processing system from image frame to image frame, comprising:
   means for capturing a first image;
   means for identifying an object of interest in said first image with a reference patch;
   means for capturing a second image;
   means for estimating a position of said object of interest in said second image through the use of a dead reckoning algorithm, and marking said position with a trial patch;
   means for cross correlating said trial patch and said reference patch;
   means for using said cross correlation to make corrections to said dead reckoning algorithm;
   further means for using said cross correlation to calculate tie points;
   using said tie points to establish a common coordinate system between said first and said second image; and
   means for identifying reference patches that have been determined by a classification algorithm, and releasing said reference patches to free up processing resources.

11. The apparatus to track objects in a video processing system according to claim 10, wherein said reference patch is identified through a contrast anomaly.

12. The apparatus to track objects in a video processing system according to claim 10, wherein said corrections to said dead reckoning algorithm are based on the displacement of a correlation peak of said cross correlation, and further wherein said corrections are fed into said dead reckoning algorithm to correct future predictions of trial patch locations.

13. The apparatus to track objects in a video processing system according to claim 10, wherein said tie points are used to register said images.

14. The apparatus to track objects in a video processing system according to claim 10, wherein said reference patch is identified so as to have strong texture.

15. The apparatus to track objects in a video processing system according to claim 10, further comprising the step of identifying a second object of interest with a released reference patch.

16. The apparatus to track objects in a video processing system according to claim 10, wherein said dead reckoning algorithm is corrected by adjusting coefficients within said dead reckoning algorithm.

17. The apparatus to track objects in a video processing system according to claim 10, wherein said tie points are used as coefficients in a bilinear interpolation, said bilinear interpolation resulting in the registration of images in a common coordinate system.

18. The apparatus to track objects in a video recording system according to claim 10, wherein said reference patch identifies an object of interest that is in motion, and further wherein said reference patch that is associated with said object of interest in motion is rejected.

19. A system to track objects during video processing from image frame to image frame, comprising:
   a camera for capturing a first image;
   a processor for identifying an object of interest in said first image with a reference patch;
   the camera capturing a second image;
   processor means for estimating a position of said object of interest in said second image through the use of a dead reckoning algorithm, and marking said position with a trial patch;
   processor means for cross correlating said trial patch and said reference patch;
   using said cross correlation to make corrections to said dead reckoning algorithm;
   further using said cross correlation to calculate tie points;
   using said tie points to establish a common coordinate system between said first and said second image; and
   means for identifying reference patches that have been determined by a classification algorithm, and releasing said reference patches to free up processing resources.

20. The system to track objects during video processing from image frame to image frame according to claim 19, wherein said reference patch is identified through a contrast anomaly.

* * * * *